(12) United States Patent
Colling

(10) Patent No.: US 6,326,592 B1
(45) Date of Patent: Dec. 4, 2001

(54) BASE FOR FOOT CONTROL

(75) Inventor: Ronald W. Colling, Kaukauna, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/648,216

(22) Filed: Aug. 25, 2000

(51) Int. Cl.⁷ .................................................. B23K 9/10
(52) U.S. Cl. ............................................ 219/132; 338/153
(58) Field of Search ............................. 219/132; 338/153

(56) References Cited

U.S. PATENT DOCUMENTS

| | | | |
|---|---|---|---|
| 2,308,199 | * 1/1943 | Mullenbach | 338/153 |
| 2,349,891 | 5/1944 | Tyrner | 201/55 |
| 2,379,774 | * 7/1945 | Wyer | 338/153 |
| 2,383,725 | * 8/1945 | Landis et al. | 219/132 |
| 2,681,586 | 6/1954 | Pressler | 84/1.27 |
| 2,798,209 | 7/1957 | Gordon | 336/117 |
| 3,371,506 | 3/1968 | Zahn | 67/7.1 |
| 3,402,341 | 9/1968 | Cook | 322/16 |
| 4,227,066 | 10/1980 | Bulwidas | 219/132 |
| 4,322,711 | 3/1982 | Spangler et al. | 338/153 |
| 4,345,607 | 8/1982 | Contreras | 132/83 |
| 4,787,590 | 11/1988 | Melvin | 248/293 |
| 5,793,016 | 8/1998 | Colling et al. | 219/132 |

FOREIGN PATENT DOCUMENTS 35 44280 A1   6/1987  (DE) .

* cited by examiner

*Primary Examiner*—Clifford C. Shaw
(74) *Attorney, Agent, or Firm*—John H. Pilarski; Mark W. Croll; Donald Cayen

(57) ABSTRACT

A welding machine foot control has exceptional convenience for routing the control cable to the welding machine and stability against tipping over. The foot control enclosure has openings for the control cable on multiple walls such that the cable can emerge from a desired side of the enclosure for routing convenience. A stabilizer on the bottom of the enclosure adds weight at a low center of gravity. The base has a top flange that mounts over a bottom cover of the foot control enclosure. Multiple walls diverge from the top flange toward a bottom flange. There is a slot through the top flange and adjacent portion of each wall. The cable standing end passes through a notch in a base top flange and associated wall and lies alongside the bottom cover. The cable running end is arranged to emerge from a selected wall of the base through the associated slot. A cable strain relief is formed by an arm in the base.

39 Claims, 6 Drawing Sheets

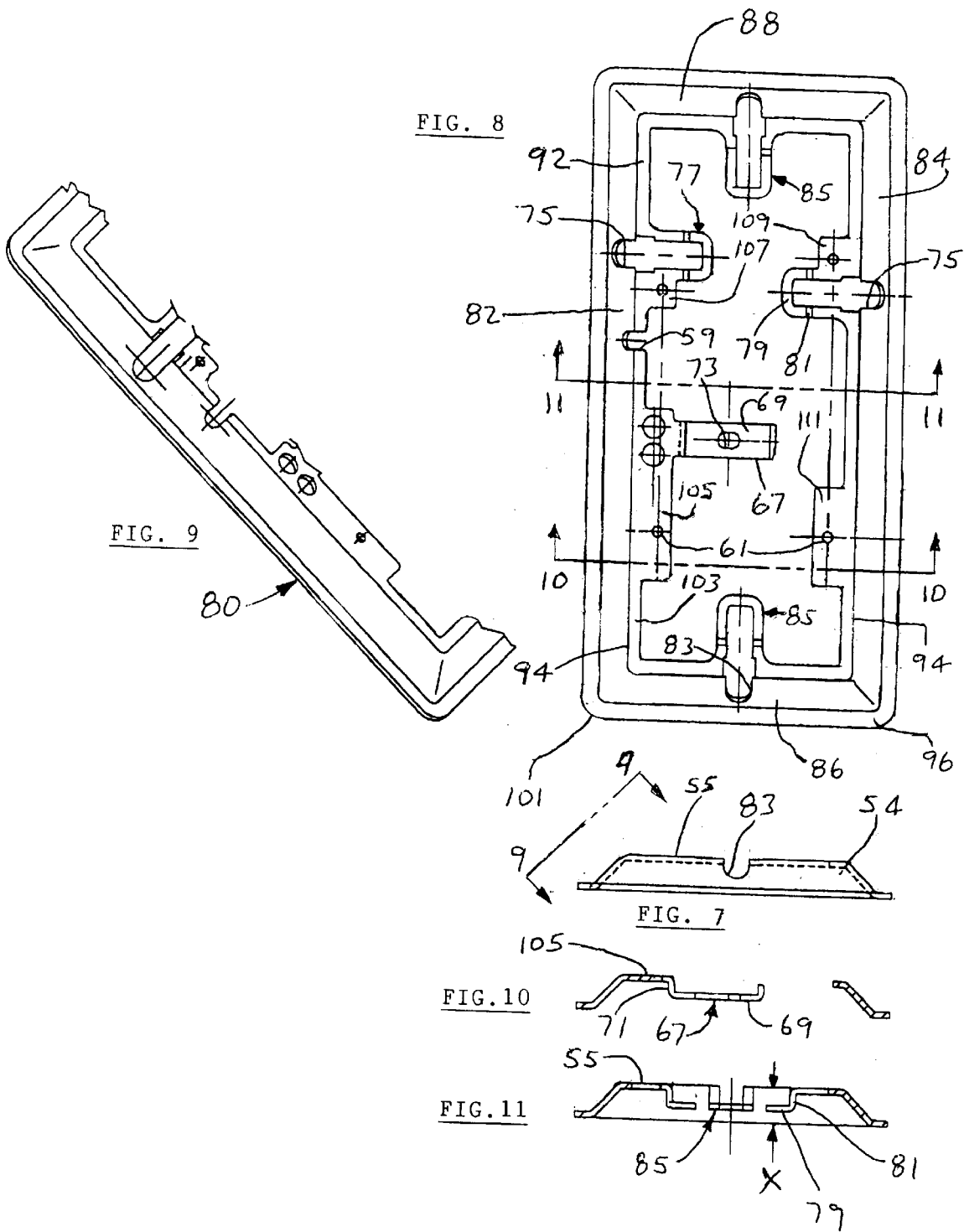

BASE FOR FOOT CONTROL

BACKGROUND OF THE INVENTION

1. Field of the Invention

This invention pertains to electric welding controls, and more particularly to foot controls that regulate welding machine output.

2. Description of the Prior Art

In tungsten inert gas (TIG) welding, it is known to regulate the welding machine output by means of a foot operated remote control. The operator uses his foot to pivot a pedal of the foot control and thereby vary the power at the welding arc.

Because TIG foot controls are typically used on the floor of a workplace, they are subject to hard use and even abuse. For example, the abrasive nature of a concrete floor may subject the foot control to excessive wear.

A related problem is that foot controls are prone to being tipped over. In addition to the potential for being damaged, an overturned foot control requires the operator to bend over and place it upright before it can be used again.

A common characteristic of prior foot controls was that the control cable between them and the welding machines emerged at fixed positions from the foot controls. The fixed position from which the cable emerged from the foot control may have hindered direct routing of the cable between the foot control and the welding machine. Under some operating conditions, the foot control had to be located such that the cable was exposed to workers walking on it or vehicles rolling over it. Additionally, other structures at the work station could interfere with the preferred routing of the cable. Some welding operations required that the foot control be in contact with or very close to a building wall or similar vertical surface. In those situations, it was difficult for the operator to pivot the pedal and obtain desired operation.

An exemplary prior foot control for TIG welding is disclosed in U.S. Pat. No. 5,793,016, the disclosure of which is incorporated by reference herein. The foot control of the U.S. Pat. No. 5,793,016 patent has given satisfactory performance, and it has enjoyed considerable commercial success. Nevertheless, like other prior foot controls, it is subject to further improvements.

SUMMARY OF THE INVENTION

In accordance with the present invention, a foot control for TIG welding machines is provided that is more versatile and stable than prior foot controls. This is accomplished by incorporating multiple control cable outlets in the foot control, and by a stabilizer with a large footprint.

The foot control of the invention may be generally similar to prior foot controls commonly used on TIG welding machines. The foot control has an enclosure with side walls and an open underside that is closeable with a bottom cover. A control cable leads from the enclosure to the welding machine. A pedal pivots on the enclosure. Pivoting the pedal operates components that control the voltage to a TIG welding torch.

According to one aspect of the invention, the enclosure is designed with an opening in more than one of the side walls. In that manner, the cable can be routed to the welding machine that promotes ease of use and protection from damage to the cable. A labyrinth within the enclosure in association with each opening restrains the cable from being pulled out of the enclosure.

The stabilizer is comprised of multiple walls and a top flange. The top flange is inturned from the walls. The stabilizer top flange mounts to the foot control enclosure using the same fastener holes that normally are used for the screws that fasten the bottom cover to the enclosure. Preferably, the stabilizer also has a bottom flange that is outturned from the walls.

To use the stabilizer, the screws fastening the foot control bottom cover to the enclosure are removed, but the bottom cover is not removed from the enclosure. The stabilizer is placed on the bottom cover. Then the screws are replaced to mount the stabilizer to the foot control enclosure. The weight and enlarged footprint of the stabilizer bottom flange add stability to the foot control, as well as providing a larger and harder wear surface.

The features of versatile foot control cable routing and stability are combined by using a base in which the top flange and an adjoining portion of one of the walls are notched to receive the control cable from the foot control enclosure. With the notched base, only one wall of the foot control enclosure need have a control cable opening. In a preferred embodiment, there are four walls in the base. The top flange is slotted in four places, with each of the slots extending into an adjoining portion of a different wall. The slots are sized and shaped to receive a grommet. There is a plate connected to the top flange in operative association with each slot. Each plate has a leg at a distance from the plane of the top flange that is approximately the same as the diameter of the control cable. An arm is also joined to the top flange.

In use, a grommet is slipped over the foot control cable. The screws fastening the foot control bottom cover to the enclosure are removed, but the bottom cover is not removed from the enclosure. The cable is bent downwardly to lie alongside the bottom cover. The cable running end is arranged to pass beyond a selected edge of the bottom cover. The base is placed on the bottom cover, with the notch in the base wall and top flange fitting over the cable standing end, and the selected base slot fitting over the cable grommet. Then the screws are replaced to mount the base to the foot control enclosure. The cable lies between the foot control bottom cover and the plate associated with the selected slot. A strain relief is formed by a screw passing through the base arm, clamping the cable to the bottom cover. In that manner, the control cable can be arranged to emerge from the foot control from any of its sides, even though there is only one cable opening in the foot control enclosure. The plate associated with the base slot that receives the cable supports the cable from drooping below the plane of the bottom flange.

Other advantages, benefits, and features of the present invention will become apparent to those skilled in the art upon reading the detailed description of the invention.

BRIEF DESCRIPTION OF THE DRAWINGS

FIG. 4 is a top view of the stabilizer of the invention.

FIG. 5 is an end view of FIG. 4.

FIG. 7 is an end view of the base of the invention.

FIG. 8 is a top view of FIG. 7.

FIG. 9 is a partial view taken along line 9—9 of FIG. 7.

FIG. 10 is a cross-sectional view taken along line 10—10 of FIG. 8.

FIG. 11 is a cross-sectional view taken along line 11—11 of FIG. 8.

DETAILED DESCRIPTION OF THE INVENTION

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 1:
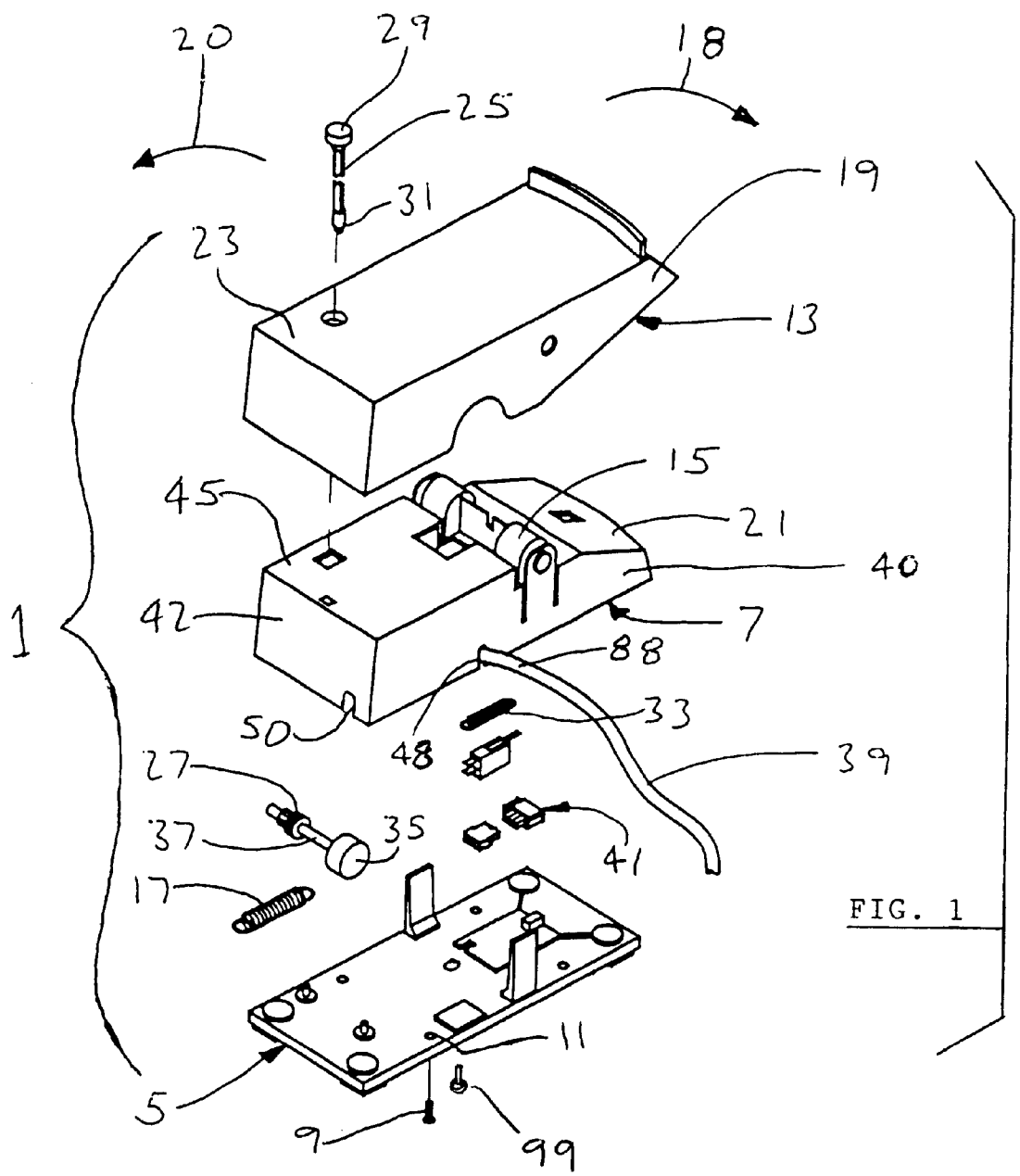
FIG. 1 is an exploded perspective view of a foot control that includes the present invention.

Referring first to FIG. 1, a foot control 1 is illustrated that is part of a TIG welding machine, not shown in the drawings. The particular foot control 1 shown is designed and manufactured according to the teachings of U.S. Pat. No. 5,793,016. However, it will be understood that the invention is not limited to use with any specific type of foot control.

Briefly by way of background, the foot control 1 is comprised of a bottom cover 5 that is fastened to the open underside of an enclosure 7 by screws 9 and 99 passing through clearance holes 11 in the cover. The enclosure 7 makes a predetermined footprint on a building floor. A pedal 13 is supported for pivoting on enclosure trunions 15. A spring 17 biases the pedal 13 in the direction of arrow 18 toward an off position whereat the pedal back end 19 rests against an enclosure sloped wall 21. By applying foot force against the pedal front end 23, the pedal pivots in the direction of arrow 20 against the force of the spring 17. Pivoting the pedal causes a timing belt 25 to rotate a pulley 27 that is rotationally supported in the enclosure. One end 29 of the timing belt 25 is anchored to the pedal. The other end 31 of the timing belt is connected to a spring 33 that in turn connects to the enclosure. A potentiometer 35 on the same shaft 37 as the pulley 27 rotates to control the electric characteristics of the welding machine in proportion to the amount of pivotal movement of the pedal by an operator. A control cable 39 connects to the potentiometer 35 and other electrical components collectively shown at reference numeral 41.

Figure 2:
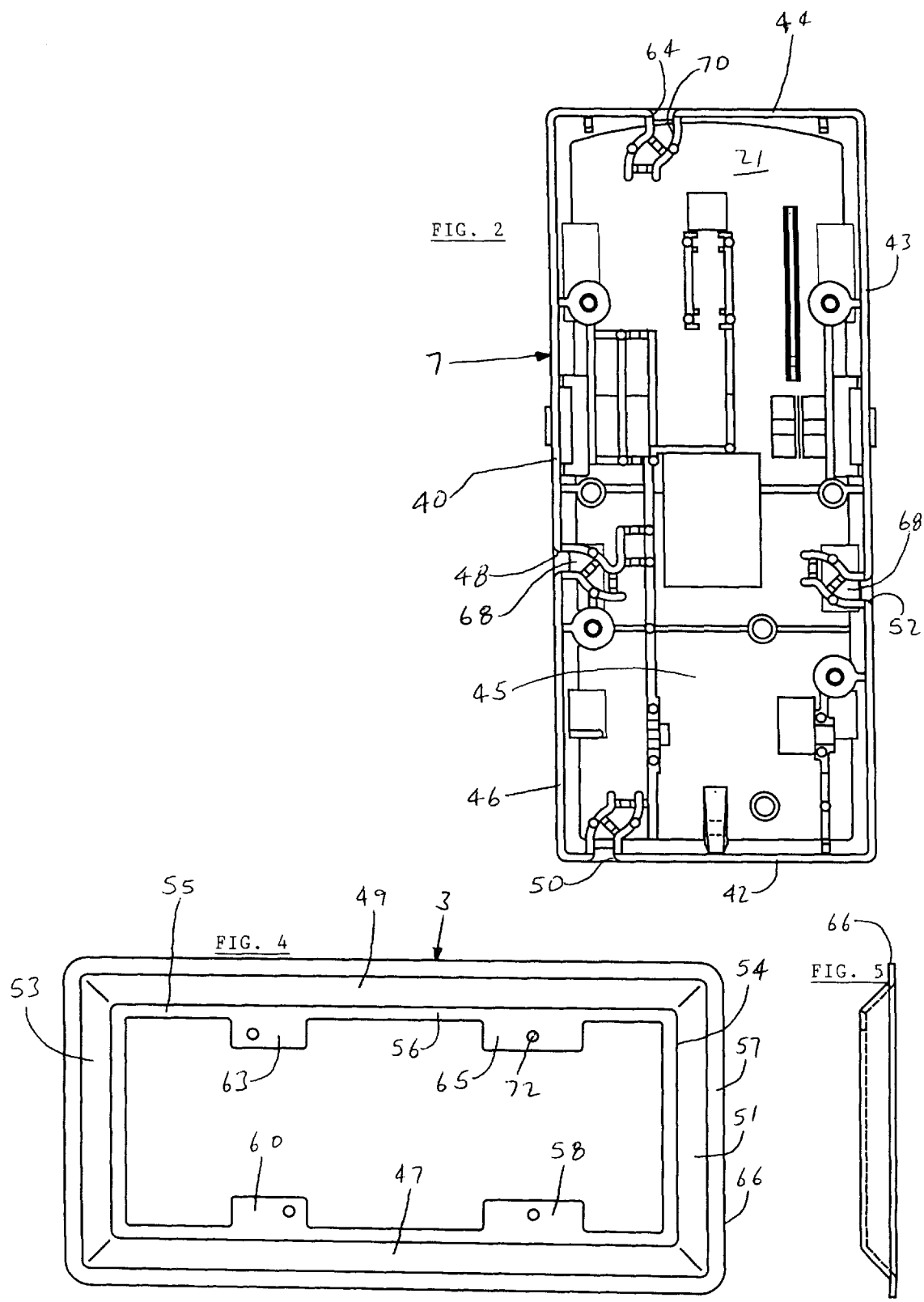
FIG. 2 is a bottom view of the foot control enclosure of FIG. 1.

In accordance with the present invention, the foot control 1 provides increased versatility and convenience in routing the control cable 39 to the welding machine. For that purpose, the foot control enclosure 7 is designed with four side walls 40, 42, 43, and 44. Also see FIG. 2. The side walls 40, 42, 43, and 44 are relatively thin. They terminate at a common bottom surface 46 that surrounds the enclosure open underside. The side walls connect with the sloped wall 21 and a horizontal top wall 45.

In each side wall 40, 42, 43, and 44 of the enclosure 7 is a respective slotted opening 48, 50, 52, and 64. Each opening 48, 50, 52, and 64 extends from the bottom surface 46. Leading inwardly from each opening into the enclosure interior is an associated labyrinth 68. Each labyrinth 68 has parallel curved walls 70 that are spaced apart a distance generally equal to the diameter of the control cable 39.

In use, the location of the foot control 1 that is most convenient for welding the workpiece at hand is determined. The control cable 39 is then routed between the foot control and the welding machine to suit the foot control location. The cable is laid in the desired labyrinth 68 to pass through the associated enclosure opening 48, 50, 52, or 64. In FIG. 1, for example, the cable is shown passing through the enclosure side wall 40 by means of the opening 48. After the bottom cover 5 has been replaced using the screws 9 and 99, the foot control is ready for use in the normal manner. When a new workpiece or job site makes a different routing for the cable between the foot control and the welding machine desirable, the bottom cover is removed from the enclosure 7. The cable is passed through the newly chosen enclosure opening and relaid in the associated labyrinth.

Figure 3:
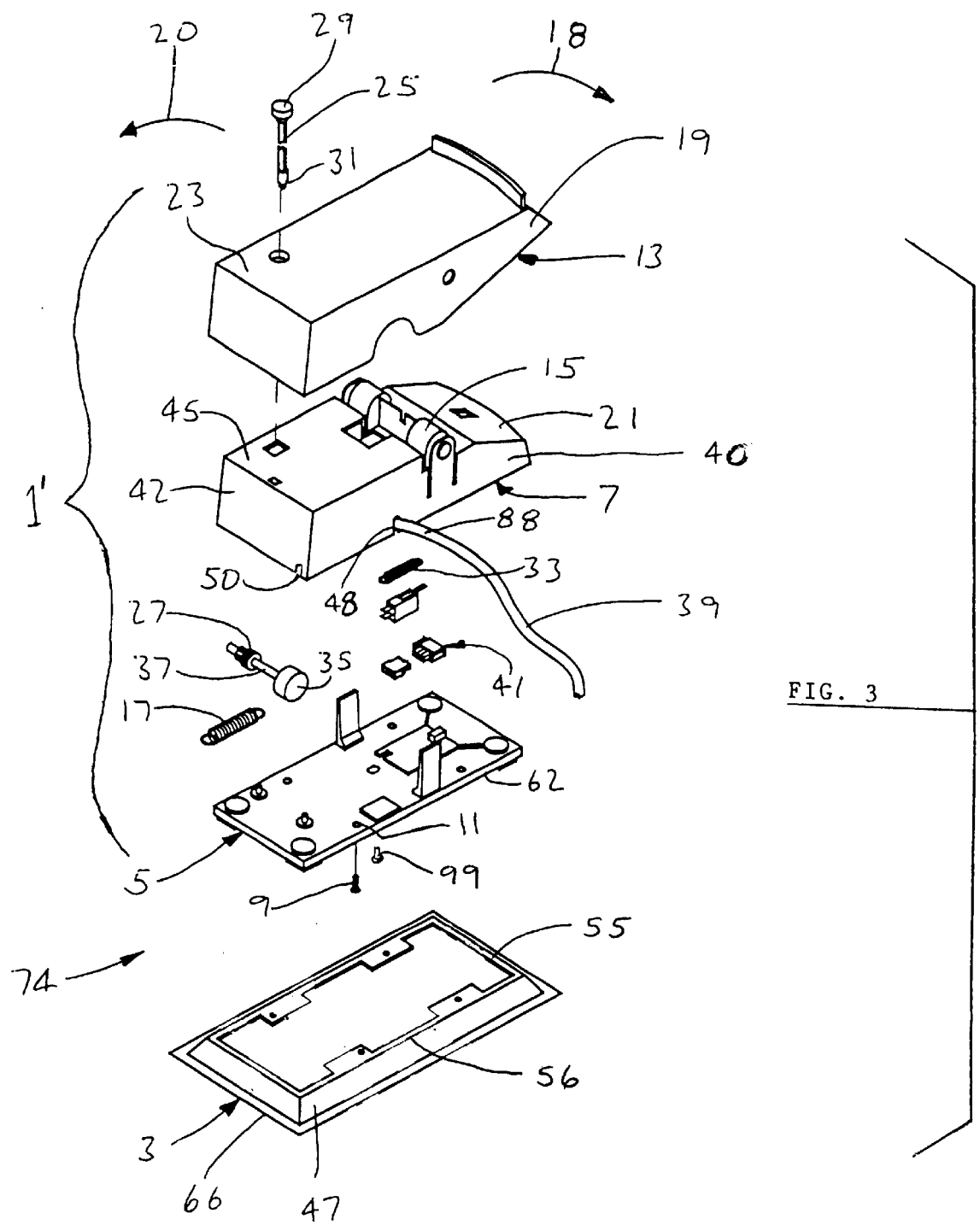
FIG. 3 is an exploded perspective view of a foot control with a stabilizer that adds stability to the foot control.
Figure 6:
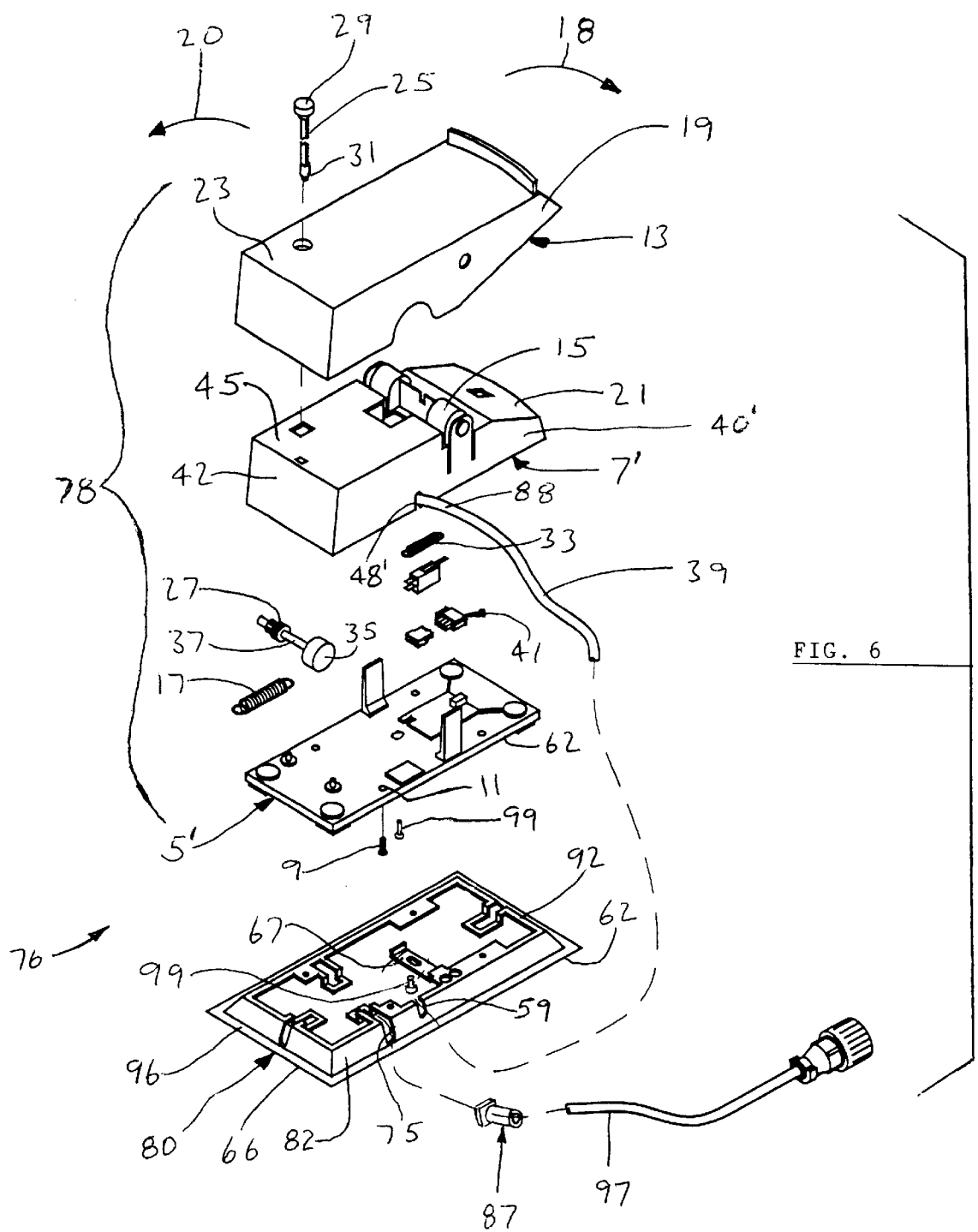
FIG. 6 is an exploded view of a foot control that possesses both stability and convenience in routing the control cable.

An important feature of the invention is its stability against tipping over. Turning to FIG. 3, a foot control 1' is shown that is substantially identical to the foot control 1 described previously in connection with FIGS. 1 and 2. To the foot control 1' is added a stabilizer 3. Looking also at FIGS. 4 and 5, the stabilizer 3 is made of heavy gauge steel plate and is comprised of two side walls 47, 49 and two end walls 51, 53. Upper edges of the walls 47, 49, 51, 53 terminate in an inturned top flange 55. The outer perimeter 54 of the top flange 55 is substantially the same as the outer perimeter 62 of the foot control bottom cover 5. The lower edges of the walls terminate in an outturned bottom flange 57. Also in the preferred embodiment, the walls diverge away from the top flange toward the bottom flange 57. The outer perimeter 66 of the base bottom flange is thus substantially larger than the perimeter 62 of the foot control bottom cover.

In the preferred embodiment, the stabilizer top flange 55 is formed with an irregular interior outline having relatively narrow portions 56 and four tabs 58, 60, 63, and 65. In each of the tabs 58, 60, 63, and 65 is a clearance hole 72. The clearance holes 72 are in the same relative locations as the clearance holes 11 in the bottom cover 5.

The stabilizer 3 is used by removing the screws 9 and 99 from the foot control enclosure 7 and the bottom cover 5, but the bottom cover is not removed from the enclosure. The top flange 55 of the stabilizer is placed against the foot control bottom cover such that the holes 72 and 11 align. The screws 9 and 99 are then replaced. The resulting assembly 74 of the foot control 1' and the stabilizer 3 has a larger footprint than the footprint made by the enclosure side walls 40, 42, 43, and 44 of the foot control 1'. The heavy weight of the stabilizer at a low center of gravity further contributes to the resistance of the assembly 74 against tipping over. The stabilizer also reduces wear on the enclosure from abrasive surfaces such as concrete floors.

The features of increased foot control convenience and stability are combined in an enhanced welding machine foot control system 76, FIGS. 6–11. The foot control system 76 is comprised of a foot control 78 that is generally identical to the foot controls 1 and 1' described previously, and of a base 80. The base 80 adds both stability and protection to the foot control 78 and convenience in routing the control cable 39. The base is made of heavy gauge sheet plate. As illustrated, it is manufactured with two side walls 82, 84 and two end walls 86, 88. Upper edges of the walls 82, 84, 86, 88 terminate in an inturned top flange 92. The outer perimeter 94 of the top flange 92 is substantially the same as the outer perimeter 62 of the foot control bottom cover 5. The lower edges of the walls 82, 84, 86, 88 terminate in an outturned bottom flange 96. The walls diverge away from the top flange toward the bottom flange 96. The outer perimeter 101 of the bottom flange is thus substantially larger than the perimeter 62 of the foot control bottom cover.

In the illustrated construction, the base top flange 92 is formed with an irregular interior outline having a relatively narrow portion 103 and four tabs 105, 107, 109, and 111. The base top flange narrow portion 103, together with the adjoining portion of the side wall 82, has a notch 59. The notch 59 is sized to snugly receive the foot control cable 39. The top flange Labs 105, 107, 109, 111 have respective clearance holes 61 through them. The clearance holes 61 are arranged in the same pattern as the clearance holes 11 in the foot control bottom cover 5.

Inwardly extending from the base plate tab 105 is a stepped arm 67. As illustrated, the arm 67 has a first leg 69 parallel to the plane of the top flange 92 and a short second leg 71 that joins the first leg to the tab 105. There is a hole 73 through the arm first leg 69.

Each of the base top flange tabs 107, 109 has a slot 75 through it. Each slot 75 extends into the adjacent portion of the side walls 82, 84. Each slot 75 is aligned with a plate 77. Each plate 77 has a U-shaped first leg 79 that is at a distance X from the plane of the top flange 92. The distance X is equal to or slightly greater than the diameter of the foot control cable 39. The U-shaped first leg 79 is connected with the respective top flange tab by a short end leg 81. The top flange narrow portion 103 also has slots 83 through it and through the adjoining portions of each of the end walls 86, 88. The slots 83 are aligned with respective plates 85. The plates 85 are generally similar to the plates 77.

Figure 14:
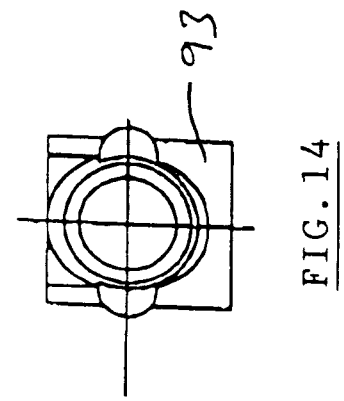
FIG. 14 is an end view of FIG. 12.
Figure 13:
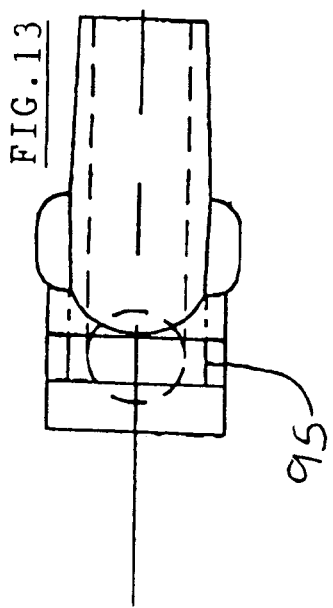
FIG. 13 is a top view of FIG. 12.
Figure 12:
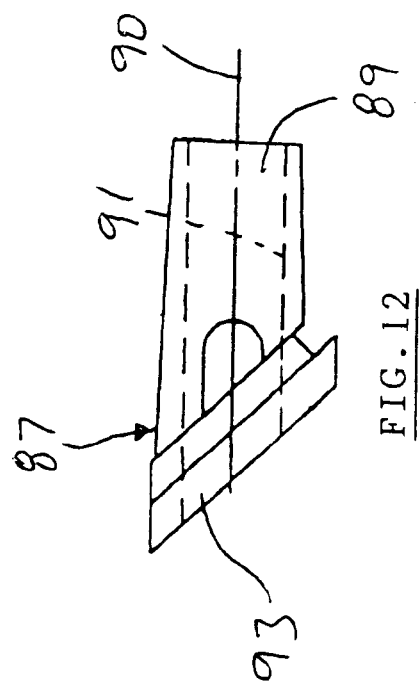
FIG. 12 is a front view of a grommet that is used with the present invention.

FIGS. 12–14 show a grommet 87 that is used with the base 80. The grommet 87 has a tubular body 89 that defines a longitudinal axis 90. The body 89 has an inner diameter 91 that is slightly larger than the diameter of the foot control cable 39. The grommet has a rectangular shaped head 93 that lies in a plane that is not perpendicular to the longitudinal axis 90. There are a pair of opposed grooves 95 in the head 93. The head and grooves 95 make approximately the same angle with respect to the longitudinal axis 90 as the base walls 82, 84, 86, 88 make with the plane of the top flange 9.

To use the base 80, the foot control enclosure 7' need have only one opening in the side walls. In the particular construction illustrated, the enclosure 7' has a single opening 48' in the side wall 40'. However, if desired there may be an opening in more than one side wall, such as an opening in each of the side walls analogous to the openings 48, 50, 52, and 64 in the enclosure 7 as described previously (FIGS. 1 and 2). The grommet 87 is installed over the control cable 39, FIG. 6. The screws 9 and 99 are removed from the foot control enclosure 7' and bottom cover 5', but the cover is not removed from the enclosure. The cable standing end 88 is turned downwardly against the bottom cover periphery 62 and laid alongside the cover. The operator decides which side of the foot control system 76 the cable should emerge such that the cable is most conveniently located for operation or best protected from damage by foot and wheeled traffic. He arranges the cable such that its running end 97 passes outwardly beyond the selected foot control side. For example, in FIG. 6 the cable is shown emerging from the base side wall 82, which is on the same side of the system 76 as the enclosure side wall 40'. The base top flange 92 is placed against the foot control bottom cover 5' such that the notch 59 fits over the cable standing end 88. The base slot 75 fits over the grommet, with the grommet grooves engaging the base side wall 82. The cable lies between the bottom cover and the U-shaped leg 79 of the plate 77. Then the screws 9 and 99 are replaced, passing through the base holes 61 and bottom cover holes 11 and reengaging the enclosure 7'. A strain relief is formed when the control cable is routed between the bottom cover and the arm 67, and around the screw 99, and when the screw 99 is tightened into the bottom cover.

In summary, the results and advantages of welding machine foot controls can now be more fully realized. The invention provides both stability to the foot control and convenience in routing the control cable 39. The multiple openings 48, 50, 52, and 64 in the respective side walls 40, 42, 43, and 44 of the foot control enclosure 7 enable the cable to emerge from any of the sides of the foot control. The stabilizer 3 adds weight at a low center of gravity to the foot control 1', thus reducing any tendency of the foot control assembly 74 to tip over. The large footprint of the stabilizer perimeter 66 further contributes to the stability of the foot control assembly 74. In addition, the stabilizer greatly reduces wear on the foot control enclosure when the foot control is used on abrasive surfaces such as concrete floors. The base 80 enables the foot control enclosure 7' to have but a single opening 48' in a side wall and yet enable the cable to emerge from the foot control system 76 on the side that is most convenient to the operator and safest for the cable. The grommet 87 and strain relief assure that the cable is safely and securely retained in the base 80. The rings 77 and 85 support the cable from drooping below the plane of the base bottom flange 96.

Thus, it is apparent that there has been provided, in accordance with the invention, a welding machine foot control that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A foot control for a welding machine comprising:
   a. an enclosure having multiple side walls and an open underside, at least two of the side walls defining an opening therethrough;
   b. a bottom cover fastened to the enclosure for closing the open underside thereof;
   c. a pedal that pivots on the enclosure;
   d. means for controlling the electrical characteristics of a welding machine in response to pivoting of the pedal on the enclosure; and
   e. a control cable connected between the means for controlling the electrical characteristics of the welding machine and the welding machine, the control cable being passable through a selected one of the openings in the enclosure side walls,
      so that the control cable is passable through the opening of the enclosure side wall that is most convenient for routing the control cable to the welding machine.

2. The foot control of claim 1 wherein the enclosure has four side walls, and wherein each of the side walls defines an opening therethrough to thereby enable the control cable to be routed between the foot control and the welding machine from four different sides of the foot control.

3. The foot control of claim 1 wherein the enclosure is fabricated with a labyrinth in operative association with each opening, the control cable being laid in the labyrinth associated with the opening in the wall through which the control cable passes.

4. The foot control of claim 1 further comprising:
   a. a heavy stabilizer placed against the bottom cover; and b. means for fastening the stabilizer to the enclosure,
so that the stabilizer adds weight to the foot control that enables the foot control to resist tipping over.

5. The foot control of claim 4 wherein the stabilizer comprises:
   a. multiple walls having respective upper and lower edges;
   b. an inturned top flange joining the upper edges of the stabilizer walls and defining a first plane; and
   c. a bottom flange outturned from the lower edges of the stabilizer walls.

6. The foot control of claim 5 wherein the stabilizer walls are not perpendicular to the first plane.

7. The foot control of claim 4 wherein the stabilizer comprises:
   a. an inturned top flange alongside the bottom cover and defining a first plane;
   b. multiple stabilizer walls having respective upper edges joined to the top flange and diverging therefrom; and
   c. an outturned bottom flange along the stabilizer walls bottom edges,
      so that the stabilizer provides an increased footprint to the foot control that aids in resisting the foot control from tipping over.

8. Apparatus for controlling a welding machine comprising:
   a. an enclosure having multiple side walls and an open underside, at least one side wall having an opening therethrough;
   b. a bottom cover fastened to the enclosure to close the enclosure underside;
   c. means on the enclosure for controlling a welding machine in response to actuation by an operator;
   d. a control cable routed from the means for controlling the welding machine to the welding machine through the opening in said at least one side wall of the enclosure; and
   e. means for stabilizing the foot control from tipping over.

9. The apparatus of claim 8 wherein the means for stabilizing the foot control comprises a stabilizer adjacent the bottom cover and fastened to the enclosure.

10. The apparatus of claim 9 wherein the stabilizer comprises:
    a. multiple walls having respective upper and lower edges;
    b. an inturned top flange joining the upper edges of the stabilizer walls and defining a first plane; and
    c. a bottom flange outturned from the lower edges of the stabilizer walls.

11. The apparatus of claim 9 wherein the stabilizer comprises:
    a. an inturned top flange alongside the bottom cover and defining a first plane;
    b. multiple walls having respective upper edges joined to the top flange and diverging therefrom; and
    c. an outturned bottom flange along the walls bottom edges,
       so that the stabilizer provides an increased footprint to the foot control that aids in resisting the foot control from tipping over.

12. The apparatus of claim 8 wherein at least two enclosure side walls have openings therethrough,
    so that the control cable is routable to the welding machine through the opening of a selected one of said at least two enclosure side walls that is the most convenient for the operator.

13. The apparatus of claim 8 wherein each of the enclosure side walls has an opening therethrough,
    so that the control cable is routable to the welding machine through a selected one of the openings in the enclosure side walls that is the most convenient for the operator.

14. A base for use with a welding machine foot control having a control cable of a predetermined diameter comprising:
    a. multiple walls having respective upper and lower edges; and
    b. an inturned top flange joining the upper edges of the walls and defining a first plane, the top flange defining a plurality of slots each extending into an adjacent portion of the associated wall and sized to receive a control cable connected to a foot control, the top flange further defining a notch that extends into the associated wall and sized o receive the control cable.

15. The base of claim 14 further comprising an arm joined to the top flange that cooperates with the foot control to form a strain relief for the control cable.

16. The base of claim 15 wherein the step has a first leg that is generally parallel to the first plane and a second leg between the first leg and the top flange.

17. The base of claim 14 wherein there are four walls arranged in a rectangle.

18. The base of claim 17 wherein the walls are not perpendicular to the first plane.

19. The base of claim 17 wherein:
    a. the base further comprises an outturned bottom flange along the walls bottom edges; and
    b. the walls diverge from the top flange toward the bottom flange.

20. The base of claim 17 wherein the top flange defines multiple slots, there being at least one slot that extends into the adjacent portion of each wall.

21. The base of claim 14 further comprising a bottom flange outturned from the lower edges of the walls.

22. The base of claim 14 further comprising a ring connected to the top flange in association with each slot, each ring having a first leg spaced from the first plane a distance that is approximately equal to the diameter of the control cable.

23. The base of claim 14 wherein each slot is sized to receive a grommet that is over the control cable.

24. In combination with a welding machine foot control having an enclosure, a bottom cover fastened to the enclosure, a control cable emerging from the enclosure, and means for varying welding power in a welding machine by sending a signal through the control cable,
    apparatus that improves the stability of the foot control and provides convenience in routing the control cable comprising:
    a. a base comprising:
       i. a top flange defining a top plane and contactable with the foot control cover, the top flange having multiple slots and a notch therein; and
       ii. a plurality of walls each having a top edge joined to the top flange, each slot and the notch in the top flange extending into an adjoining portion of the associated wall; and
    b. means for fastening the base top flange to the foot control enclosure with the foot control bottom cover between the base top flange and the enclosure, so that a standing end of the control cable is receivable in the base notch to lie alongside the foot control cover, and a running end of the cable is receivable in a selected one of the base slots to enable the cable to emerge from a selected one of the base walls.

25. The combination of claim 24 wherein:

a. the base comprises four walls each with a lower edge; and b. the base further comprises a bottom flange outturned from the bottom edges of the respective walls.

26. The combination of claim 25 wherein the base walls diverge from the top flange toward the bottom flange.

27. The combination of claim 24 wherein the base further comprises a ring connected to the top flange in operative association with each slot, each ring having a first leg that is spaced a predetermined distance from the top plane, each ring further having a second leg that connects the first leg to the top flange.

28. The combination of claim 24 wherein the base further comprises an arm joined to the base top flange that cooperates with the foot control bottom cover to form a strain relief for the control cable on the foot control.

29. The combination of claim 24 further comprising a grommet over the control cable and received in the selected base slot.

30. A method of arranging a control cable of a welding machine foot control having an enclosure from which the control cable emerges, a predetermined footprint, and a bottom cover over the enclosure comprising the steps of:

a. providing a base having a top flange and multiple walls joined at respective upper edges thereof to the top flange, the top flange defining multiple slots extending into respective adjoining portions of the walls and a notch that extends into the adjoining portion of a selected wall;

b. removing screws that fasten the bottom cover to the enclosure;

c. bending a standing end of the control cable to lie alongside the bottom cover;

d. placing the base top flange on the bottom cover, and simultaneously fitting the control cable standing end into the notch in the base, and simultaneously arranging the control cable running end to fit in a selected one of the slots in the base; and e. fastening the base to the enclosure with the bottom cover between the base and the enclosure, so that the control cable emerges from the wall of the base associated with the selected slot.

31. The method of claim 30 comprising the further steps of:

a. slipping a grommet over the control cable; and b. receiving the grommet in the selected slot of the base.

32. The method of claim 30 comprising the further steps of:

a. providing the base with an arm joined to the top flange; and b. forming a strain relief for the control cable with the base arm and the foot control bottom cover.

33. The method of claim 30 wherein the step of providing a base comprises the step of providing a base having multiple walls that diverge from the top flange toward respective lower edges of the walls and having an outturned bottom flange at the walls lower edges that define a bottom plane and thereby increasing the footprint of the base relative to the footprint of the foot control enclosure.

34. The method of claim 33 wherein the step of arranging the control cable running end comprises the step of supporting the control cable from drooping below the bottom plane.

35. The method of claim 30 wherein:

a. the step of providing a base comprises the step of providing a base having a plate in operative association with each slot; and b. the step of arranging the control cable running end to fit in a selected one of the slots comprises the step of supporting the control cable between the bottom cover and the plate associated with the selected slot.

36. A method of providing stability to a welding machine foot control having an enclosure with an open underside and a predetermined footprint, a bottom cover fastened over the enclosure underside, and a control cable that passes from the enclosure to a welding machine comprising the steps of:

a. providing a stabilizer having a top flange and multiple walls joined at respective upper edges thereof to the top flange;

b. removing screws that fasten the bottom cover to the enclosure;

c. placing the stabilizer top flange against the bottom cover; and d. fastening the stabilizer to the enclosure with the bottom cover between the stabilizer top flange and the enclosure, so that the stabilizer adds weight to the foot control that aids the foot control to resist tipping over.

37. The method of claim 36 wherein the step of providing a stabilizer comprises the step of providing a stabilizer having multiple walls that diverge from the top flange toward respective lower edges of the walls and having an outturned flange at the walls lower edges and thereby increasing the footprint of the stabilizer relative to the predetermined footprint.

38. A method of routing a control cable from a welding machine foot control to a welding machine comprising the steps of:

a. providing a foot control enclosure having multiple side walls;

b. providing an opening through each of at least two side walls of the enclosure;

c. determining the most convenient location for the foot control relative to a welding machine;

d. passing the control cable through a selected one of the openings in the enclosure side walls that suits the most convenient location for the foot control relative to the welding machine; and e. routing the control cable from the foot control enclosure to the welding machine.

39. The method of claim 38 wherein the step of providing an opening comprises the step of providing an opening through each of the enclosure side walls.

* * * * *